(12) United States Patent
Kubota et al.

(10) Patent No.: US 8,200,973 B2
(45) Date of Patent: Jun. 12, 2012

(54) METHOD AND APPARATUS FOR ENCRYPTED AUTHENTICATION

(75) Inventors: Akihiro Kubota, Stuttgart (DE); Hideyuki Hatakeyama, Fukushima (JP)

(73) Assignee: Alpine Electronics Inc., Tokyo (JP)

( * ) Notice: Subject to any disclaimer, the term of this patent is extended or adjusted under 35 U.S.C. 154(b) by 795 days.

(21) Appl. No.: 12/270,478

(22) Filed: Nov. 13, 2008

(65) Prior Publication Data
US 2009/0177885 A1 Jul. 9, 2009

(30) Foreign Application Priority Data
Jan. 7, 2008 (JP) ................................ 2008-000610

(51) Int. Cl.
*H04L 9/12* (2006.01)
(52) U.S. Cl. ........ 713/171; 713/168; 713/155; 713/161; 380/277; 380/281; 380/284; 726/2
(58) Field of Classification Search .................. 713/171, 713/168, 155, 161; 380/277; 726/2
See application file for complete search history.

(56) References Cited

U.S. PATENT DOCUMENTS

| | | | |
|---|---|---|---|
| 6,782,476 B1 | 8/2004 | Ishibashi | |
| 7,328,455 B2 * | 2/2008 | Jutzi et al. | 726/26 |
| 7,581,100 B2 * | 8/2009 | Mizrah | 713/171 |
| 7,739,495 B2 * | 6/2010 | Asano et al. | 713/158 |
| 2005/0216730 A1 * | 9/2005 | Morino et al. | 713/153 |
| 2005/0232426 A1 * | 10/2005 | Konersmann et al. | 380/277 |
| 2005/0232427 A1 * | 10/2005 | Konersmann | 380/277 |
| 2006/0090074 A1 * | 4/2006 | Matoba | 713/171 |
| 2007/0162753 A1 * | 7/2007 | Nakano et al. | 713/171 |
| 2007/0204161 A1 * | 8/2007 | Isozaki et al. | 713/171 |

FOREIGN PATENT DOCUMENTS
JP 2005-064825 10/2005

OTHER PUBLICATIONS

European Search Report for European Application No. 08164048.4, dated Mar. 1, 2012, (2 pgs.).
Hitachi, Ltd, et al., "5C Digital Transmission Content Protection White Paper Passage," Jan. 1, 1998, pp. 1-13.

* cited by examiner

*Primary Examiner* — Krisna Lim
(74) *Attorney, Agent, or Firm* — Brinks Hofer Gilson & Lione

(57) ABSTRACT

A sink device including a first data processing unit and a second data processing unit authenticates the processing units, when turned on, to generate first authentication keys having the same data. When a data request is issued from the sink device to the source device, device authentication is made between the source device and the first data processing unit to generate second authentication keys having the same data. The source device encrypts an exchange key using the second authentication key, and sends the encrypted exchange key to the first data processing unit. The first data processing unit decrypts the encrypted exchange key using the second authentication key, encrypts the decrypted exchange key using the first authentication key, and sends the encrypted exchange key to the second data processing unit. The second data processing unit decrypts the encrypted exchange key using the first authentication key to obtain an exchange key.

12 Claims, 5 Drawing Sheets

METHOD AND APPARATUS FOR ENCRYPTED AUTHENTICATION

BACKGROUND OF THE INVENTION

1. Related Applications

The present application claims priority to Japanese Patent Application Number 2008-000610, filed Jan. 7, 2008, the entirety of which is hereby incorporated by reference.

2. Field of the Invention

The present invention relates to a method and an apparatus for high-speed encrypted authentication of digital devices connected to a network during the transmission or reception of content.

3. Description of the Related Art

The recent rapid spread of digital-data communication technology enables the transmission and reception of data without degradation between devices, which greatly increases convenience, allowing many devices to transmit or receive data by digital communications. However, as shown in FIG. 4, in a system configuration having a source device A 101 and a source device B 102 that transmit digital data and a sink device C 103 and a sink device D 104 that receive and use the digital data, which are connected with a bus line 105, wherein the source device A 101 may be a DVD player, the source device B 102 may be a digital TV tuner, the sink device C 103 may be a monitor, and the sink device D 104 may be a HDD, such digital-data transmission and reception technology allows digital data from AV-data source devices, such as a DVD player and a digital TV tuner, to be used without degradation by the HDD and the like. Thus, data whose copyright is claimed is provided, with prohibition of processing, to a sink device that processes the data, or with restriction, such as permission of one recording, to a recording medium such as a HDD.

For example, when the source device A 101 is a DVD player and the sink device C 103 is a monitor, the system has the internal configuration shown in FIG. 5. The DVD player of a source device A 111 extracts audio and image data from a DVD. The data is output via a bus connecting section 113 and received by a bus connecting section 114 of the monitor of a sink device C 112. The monitor divides the received data into image data and audio data again, whose signals are processed so that an image is output to an LCD 115 for display and voice is output from a speaker 116.

When devices are connected via a bus so as to exchange data by the method of IEEE1394 in consideration of the limit of data exchange, such a system and device configuration conducts device authentication to verify whether the devices connected to the bus are genuine. Then a public key is generated to each device so that only an authenticated device can receive content data such as AV data with or without the above-mentioned restriction. Content is encrypted using the public key and sent to the authenticated device. The authenticated device receives the encrypted data and deciphers or decrypts it with the public key into the original AV data for use.

Examples of the public key include an authentication key based on the Diffie-Hellman (DH) key exchange which was used at an early stage and, for more reliable encryption, an exchange key that is generated by the sender of data. The exchange key is encrypted using the authentication key and sent to the authenticated receiving device. The content data can also be encrypted by the exchange key and sent. The receiving device first decrypts the exchange key using the authentication key first obtained, and decrypts the encrypted content data using the exchange key obtained.

In encrypting content data, the sending device encrypts the content data using the exchange key and a specific value, as a seed, that is, a seed key, and sends the encrypted content data. The receiving device decrypts the content data using the exchange key thus decrypted and the seed key shared by the sending device.

A technique for efficient authentication of a device connected on a bus by distributing the time of execution according to the condition of communication is disclosed in Japanese Unexamined Patent Application Publication No. 2005-64825.

The above-described device authentication using encrypted keys for transmission and reception of data is performed by the number of signals handled in the devices. Thus, for example, audio and image signals recorded in the same DVD are subjected to device authentication individually, when separately sent over the network.

For example, a monitor that receives and displays data recorded in a DVD processes an image and voice separately in parallel by its signal processing function. Therefore, its signal processing circuit uses two LSIs, an image processing LSI and an audio processing LSI. Of the AV data received, images are processed by the image processing LSI, and voice is processed by the audio processing LSI, thus allowing high-speed processing.

For example, as shown in FIG. 6, suppose that a source device 121 generates image and audio signals by a DVD signal processing LSI 123, and a sink device 122 receives the image and audio signals. The sink device 122 has an image processing LSI 124 and an audio processing LSI 125 to allow individual processing. In this case, authentication, such as device authentication, which is first performed in transmitting and receiving data, the generation of authentication keys, and the decryption of exchange keys encrypted by a received authentication key, is performed by an image processing LSI 124 and an audio processing LSI 125.

Even when a receiving device of the related art receives two or more signals using only one LSI, device authentication is performed for each signal. Accordingly, two instances of authentication are needed to handle two signals, an image signal and an audio signal, as described above. In particular, when a receiving device uses two or more LSIs, authentication is performed for each LSI as in separate devices.

As a result, with the system configuration as shown in FIG. 4, when the monitor of the sink device C 103 switches from displaying a playback signal of the DVD player of the source device A 101 to the reception of the digital TV tuner of the source device B 102, two instances of authentication for an image and voice is needed, as described above, thus taking some time to output the image and voice received by the digital TV tuner. This makes the user feel uneasy or irritated in operating the devices and uncertain about the operation and performance of the devices.

SUMMARY OF THE INVENTION

Accordingly, it is an object of the present invention to provide a method and an apparatus for encrypted authentication, in which encrypted authentication is performed on only one of signals transmitted, and encrypted authentication of the other signals is not performed or is simplified so that the output of the source device can be switched quickly.

To achieve the above object, according to a first embodiment of the invention, there is provided a method for encrypted authentication between a first device and a second device that transmit or receive a plurality of kinds of data, wherein the result of encrypted authentication performed on one kind of data is applied to the other kinds of data.

In this case, it is preferable that the result of the encrypted authentication be the result of receiving an encrypted exchange key generated by the sending device and decrypting the encrypted exchange key using an authentication key between the devices to obtain an exchange key; and the method includes the steps of receiving one kind of encrypted data encrypted using an exchange key generated by the sending device and decrypting the encrypted data using the decrypted exchange key; and decrypting the other kinds of encrypted data using the decrypted exchange key.

In another method for encrypted authentication, it is preferable that the result of the encrypted authentication be the result of receiving an encrypted exchange key generated by the receiving device and decrypting the encrypted exchange key using an authentication key between the devices to obtain an exchange key; and the method includes the steps of: receiving one kind of encrypted data encrypted using an exchange key generated by the receiving device and decrypting the encrypted data using the decrypted exchange key; and decrypting the other kinds of encrypted data using the decrypted exchange key.

In another method for encrypted authentication in encrypted-data transmission and reception between a first device including a first data processing unit and a second data processing unit and a second device, it is preferable that the method include the successive steps of generating first authentication keys by the device authentication between the first data processing unit and the second data processing unit of the first device, and generating second authentication keys by the device authentication between the first data processing unit of the first device and the second device; the first data processing unit decrypt data sent from the second device using the second authentication key, the data being encrypted by the second authentication key, encrypt the decrypted data using the first authentication key, and send the encrypted data to the second data processing unit; and the second data processing unit decrypt the encrypted data received from the first data processing unit using the first authentication key.

In this case, it is preferable that the data encrypted by the second device using the second authentication key be an exchange key; the first data processing unit decrypt a first kind of content data using the exchange key, the content data being encrypted by the second device using the exchange key; and the second data processing unit decrypt a second kind of content data using the exchange key encrypted by the first data processing unit and decrypted by the second data processing unit, the content data being encrypted by the second device using the exchange key.

In another method for encrypted authentication in encrypted-data transmission and reception between a first device including a first data processing unit and a second data processing unit and a second device, it is preferable that the first device include a first data processing unit and a second data processing unit; the method include the step of generating authentication keys by the device authentication between the first data processing unit of the first device and the second device; the first data processing unit decrypt data sent from the second device using the authentication key, the data being encrypted by the authentication key, and send the authentication key to the second data processing unit; and the second data processing unit decrypt data sent from the second device using the authentication key received from the first data processing unit, the data being encrypted by the authentication key.

In this case, it is preferable that the data encrypted by the second device using the authentication key be an exchange key; the first data processing unit decrypt a first kind of content data using the exchange key, the content data being encrypted by the second device using the exchange key; and the second data processing unit decrypt a second kind of content data using the exchange key decrypted by the second data processing unit, the content data being encrypted by the second device using the exchange key.

According to a second embodiment of the invention, there is provided an apparatus for encrypted authentication between a first device and a second device that transmit or receive data. The apparatus includes an authentication-key generating section configured to authenticate the second device that transmits a plurality of kinds of data and the first device to generate authentication keys; and a processing section configured to apply the result of encrypted authentication in the processing of one kind of data using the authentication keys to the processing of the other kinds of data.

In this case, it is preferable that the result of the authentication executed in the processing of one kind of data be the data of an exchange key obtained by receiving an encrypted exchange key generated by the sending device and decrypting the encrypted exchange key using the authentication key between the devices; and the processing section apply the data of the exchange key to the processing of the other kinds of data.

In another apparatus for encrypted authentication, it is preferable that the result of the authentication executed in the processing of one kind of data be the data of an exchange key obtained by receiving an encrypted exchange key generated by the receiving device and decrypting the encrypted exchange key using the authentication key between the devices; and the processing section apply the data of the exchange key to the processing of the other kinds of data.

In another apparatus for encrypted authentication in encrypted-data transmission and reception between a first device including a first data processing unit and a second data processing unit and a second device, it is preferable that the apparatus include a first-authentication-key generating section configured to generate first authentication keys by the device authentication between the first data processing unit and the second data processing unit of the first device; a second-authentication-key generating section configured to generate second authentication keys by the device authentication between the first data processing unit of the first device and the second device; a decrypting section of the first data processing unit configured to decrypt data sent from the second device, the data being encrypted by the second authentication key, using the second authentication key; a transmitting section of the first data processing unit configured to encrypt the data decrypted by the decrypting section of the first data processing unit using the first authentication key, and send the encrypted data to the second data processing unit; and a decrypting section of the second data processing unit configured to receive the encrypted data sent from the transmitting section of the first data processing unit and decrypt the encrypted data using the first authentication key.

In this case, it is preferable that the data encrypted by the second device using the second authentication key be an exchange key; the decrypting section of the first data processing unit decrypt a first kind of content data using the exchange key, the content data being encrypted by the second device using the exchange key; and the decrypting section of the second data processing unit decrypt a second kind of content data using the exchange key encrypted by the first data processing unit and decrypted by the second data processing unit, the content data being encrypted by the second device using the exchange key.

In another apparatus for encrypted authentication in encrypted-data transmission and reception between a first device including a first data processing unit and a second data processing unit and a second device, it is preferable that the apparatus include an authentication-key generating section configured to generate authentication keys by the device authentication between the first data processing unit of the first device and the second device; an authentication-key transmitting section configured to send the authentication key generated by the first data processing unit to the second data processing unit; a decrypting section of the first data processing section configured to decrypt data sent from the second device using the authentication key, the data being encrypted by the authentication key; and a decrypting section of the second data processing section configured to decrypt data sent from the second device using the authentication key received from the first data processing unit, the data being encrypted by the authentication key.

In this case, it is preferable that the data encrypted by the second device using the authentication key be an exchange key; the decrypting section of the first data processing unit decrypt a first kind of content data using the exchange key, the content data being encrypted by the second device using the exchange key; and the decrypting section of the second data processing unit decrypt a second kind of content data using the exchange key decrypted by the second data processing unit, the content data being encrypted by the second device using the exchange key.

In the apparatus for encrypted authentication, it is preferable that the plurality of kinds of data transmitted and received between the plurality of devices include image data and audio data related to each other.

The above configuration allows an encrypted authentication system in which encrypted authentication is performed on only one of the signals transmitted, and encrypted authentication of the other signals is not performed or is simplified so that so that the output of the source device can be switched quickly.

The present invention prevents a delay in output due to encrypted authentication of a plurality of signals. That is, encrypted authentication between a first device and a second device that transmit or receive a plurality of kinds of data is achieved by a method of applying the result of encrypted authentication performed on one kind of data to the other kinds of data and by an apparatus including an authentication-key generating section configured to authenticate a sending device that transmits a plurality of kinds of data and a receiving device to generate an authentication key; and a processing section configured to apply the result of encrypted authentication in processing of one kind of data using the authentication key to the other kinds of data.

DETAILED DESCRIPTION OF THE PREFERRED EMBODIMENTS

Figure 1:
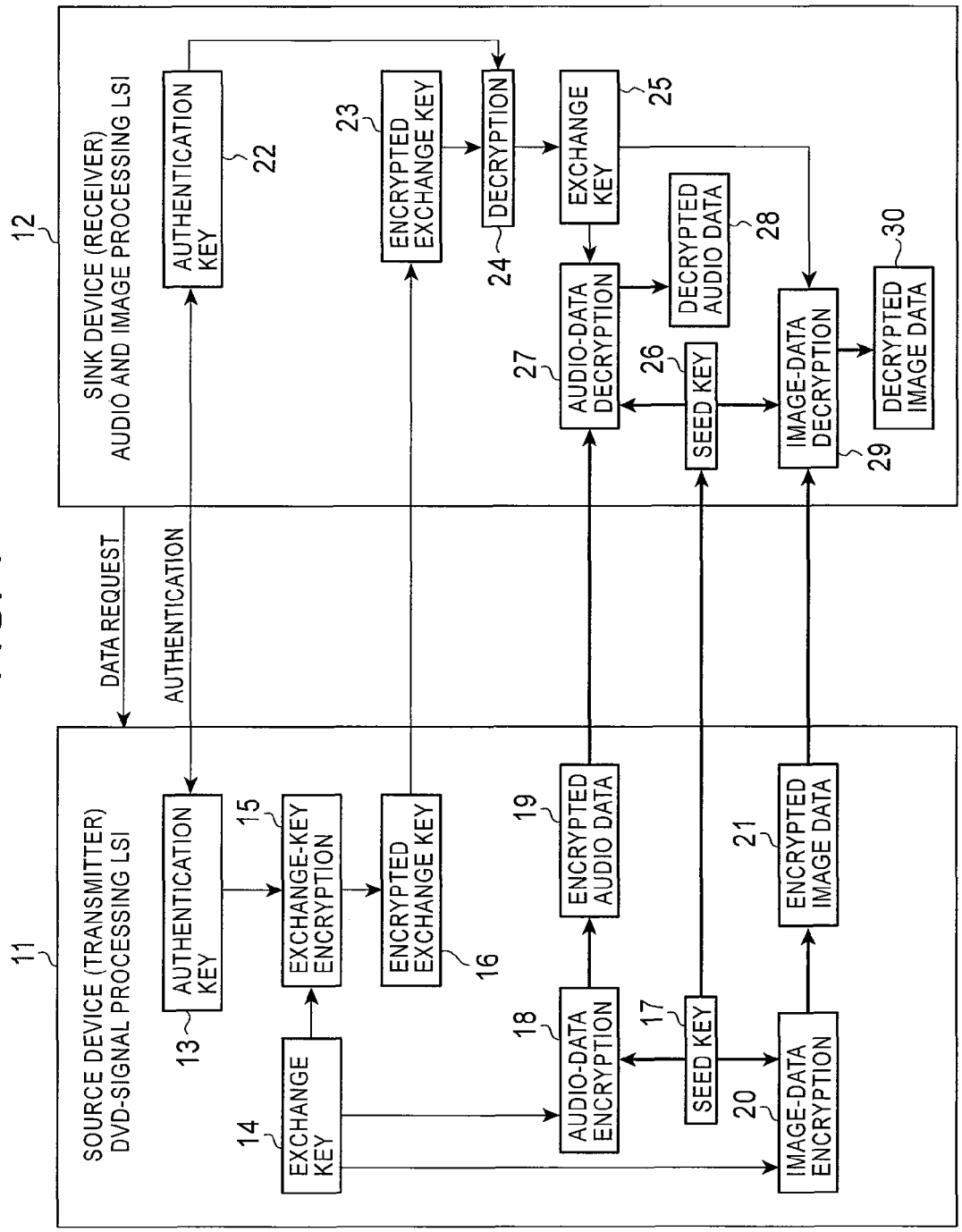
FIG. 1 is a diagram showing a system configuration and its operation according to an embodiment of the present invention.

Embodiments of the present invention will be described with reference to the drawings. FIG. 1 shows an embodiment of the present invention in which a source device 11 serving as a transmitter is a DVD-signal processing LSI and a sink device 12 serving as a receiver is an audio and image processing LSI, which is one LSI of a monitor. When the sink device 12 first issues a data request to the source device 11, authentication keys are generated for authentication between the source device 11 and the sink device 12 as in the related art. In generating the authentication keys, the devices first authenticate each other to confirm that the devices are proper. Then authentication keys are generated by the above-described Diffie Hellman key exchange. Thus, an authentication key 13 is generated in the source device 1, and an authentication key 22 having the same data as the authentication key 13 of the source device 11 is generated.

Thereafter, the source device 11 executes encryption 15 of an exchange key 14 unique to the source device 11 using the generated authentication key, thereby obtaining an encrypted exchange key 16. The source device 11 sends the encrypted exchange key 16 to the sink device 12. The source device 11 encrypts audio data and image data, which is the content data, in DVD signals using the exchange key 14 and a seed key 17, which is a given value. Audio data is subjected to audio-data encryption 18 using the exchange key 14 and the seed key 17 to create encrypted audio data 19. Likewise, image data is subjected to image-data encryption 20 using the exchange key 14 and the seed key 17 to create encrypted image data 21. The encrypted audio data 19 and the encrypted image data 21 created in that way are sent to the sink device 12. The seed key 17 is also sent to the sink device 12.

The sink device 12 receives the encrypted exchange key 16 sent in that way and holds it as an encrypted exchange key 23 of the sink device 12, and decrypts 24 the encrypted exchange key 23 using the authentication key 22 generated first. Thus, the encrypted exchange key 23 is decrypted to an exchange key 25. In audio-data decryption 27, the encrypted audio data 19 sent from the source device 11 is decrypted using this exchange key 25 and a seed key 26 of the sink device 12, which is obtained from the seed key 17 sent from the source device 11, to obtain decrypted audio data 28.

In image-data decryption 29, the image data is decrypted using the exchange key 25 obtained by the foregoing process and the seed key 26 used in the audio-data decryption 27 to obtain decrypted image data 30. When the sink device 12 is a monitor equipped with a speaker, audio data to be output from the speaker is processed using the decrypted audio data 28, and image data to be displayed by an image display device, such as an LSI, is processed using the decrypted image data 30.

To process two or more pieces of data, such as voice and an image, using only one LSI of one sink device, the above example uses the exchange key 25 generated for decrypting audio data also for decrypting image data, which is different data processing. This eliminates the need for decrypting 24 the encrypted exchange key 23 using the authentication key 22 to obtain the exchange key 25 for decrypting image data, unlike the related art. This allows content data, such as image or audio data, to be output quickly from the sink device 12.

Figure 2:
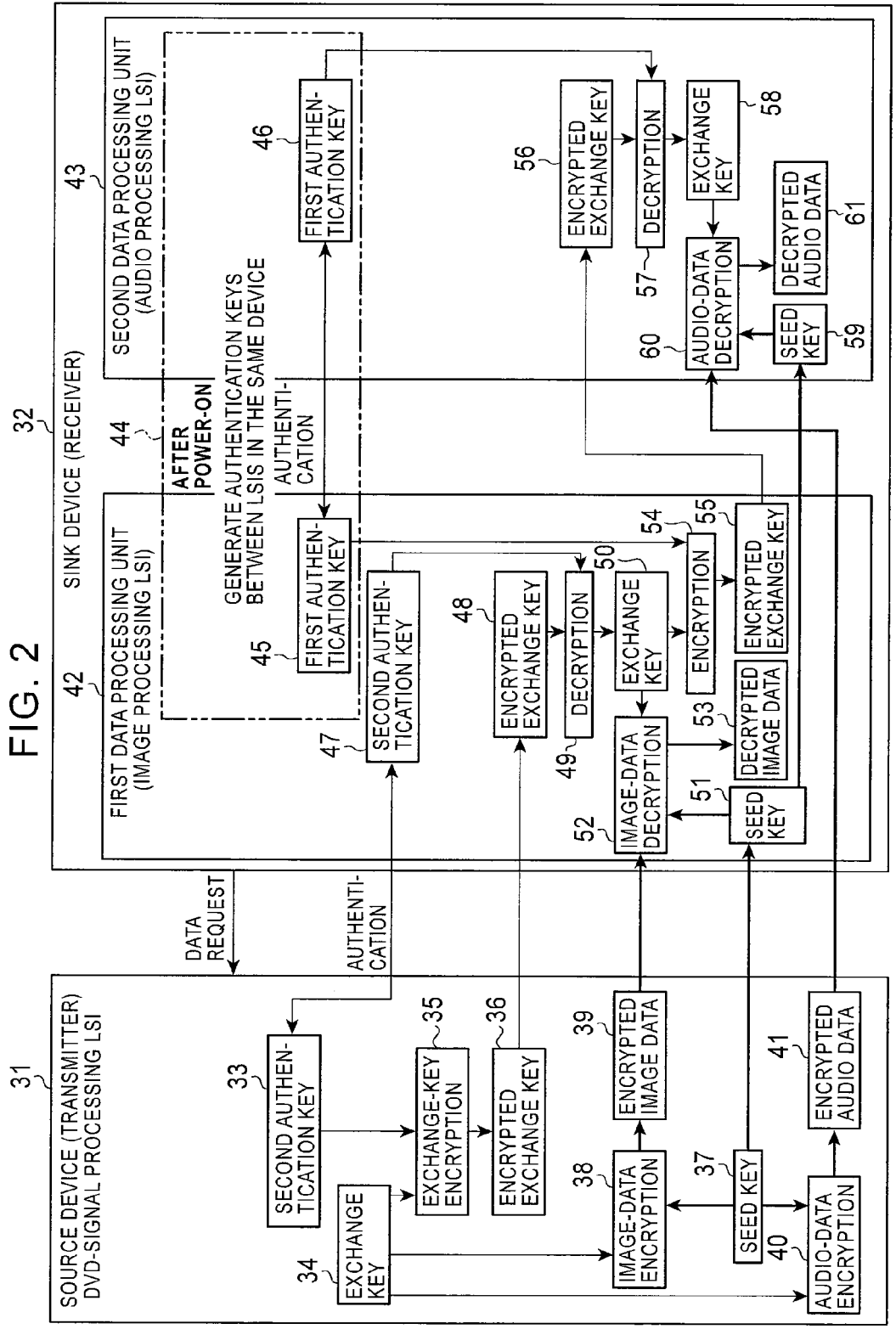
FIG. 2 is a diagram showing a system configuration and its operation according to another embodiment of the present invention.

FIG. 2 shows another embodiment of the present invention in which two LSIs are provided in one sink device so as to process two signals individually so that the LSIs can send and receive signals independently. A source device 31 shown in FIG. 2, serving as a transmitter, is an example of a DVD-signal processing LSI which operates as in the embodiment of FIG. 1. A sink device 32, serving as a receiver, is an example of a monitor or the like having a first data processing unit 42 such as an image processing LSI that processes image data and a second data processing unit 43 such as an audio processing unit such as an audio processing LSI that processes audio data.

In the embodiment of FIG. 2, after the power source of the sink device 32 is turned on, the first data processing unit 42 and the second data processing unit 43 authenticate each other by the same technique as the authentication of the source device 11 and the sink device 12 in FIG. 1 to generate authentication keys having the same data, that is, a first authentication key 45 in the first data processing unit 42 and a first authentication key 46 in the second data processing unit 43, and store them. The LSIs 42 and 43 continue the authentication using these authentication keys 45 and 46 until the power source of the sink device 32 is turned off.

When a data request is issued from the sink device 32 to the source device 31, the source device 31 and the sink device 32 authenticate each other as in the processing in FIG. 1. In the embodiment of FIG. 2, of the two LSIs 42 and 43, the first data processing unit 42 authenticates the source device 31 by the same technique as in the above to generate authentication keys having the same data, a second authentication key 33 in the source device 31 and a second authentication key 47 in the first data processing unit 42 of the sink device 32. The source device 31 then executes encryption 35 of an exchange key 34 unique to the source device 31 using the generated second authentication key 33 as in the embodiment of FIG. 1, thereby obtaining an encrypted exchange key 36. The source device 31 sends the encrypted exchange key 36 to the first data processing unit 42, or the LSI, which was authenticated earlier by the sink device 32.

The source device 31 encrypts image data and audio data using the exchange key 34 and a seed key 37 which is a given value to send the content data, as in the above. Specifically, image data is subjected to image-data encryption 38 using the exchange key 34 and the seed key 37 to generate encrypted image data 39. Likewise, audio data is subjected to audio-data encryption 40 using the exchange key 34 and the seed key 37 to generate encrypted audio data 41. The encrypted image data 39 created in that way is sent to the first data processing unit 42 of the sink device 32. The seed key 37 is also sent to the first data processing unit 42.

The first data processing unit 42 of the sink device 32 receives the encrypted exchange key 36 sent as described above and holds it as an encrypted exchange key 48 of the first data processing unit 42, and it is decrypted 49 using the second authentication key 47 which was generated earlier. Thus, the encrypted exchange key 48 is used as an exchange key 50. In image-data decryption 52, the encrypted image data 39 sent from the source device 31 is decrypted using the exchange key 50 and a seed key 51 of the first data processing unit 42, which is obtained from the seed key 37 sent from the source device 31, to obtain decrypted image data 53.

The first data processing unit 42 again encrypts 54 the exchange key 50, decrypted as described above, using the first authentication key 45, which was generated when the sink device 32 was turned on, to generate an encrypted exchange key 55, and sends the encrypted exchange key 55 to the second data processing unit 43. The encrypted exchange key 55 is held as an encrypted exchange key 56 by the second data processing unit 43. The encrypted exchange key 56 is decrypted 57 using the first authentication key 46 generated at power-on into an exchange key 58. The second data processing unit 43 receives the encrypted audio data 41 sent from the source device 31, and decrypts the encrypted audio data 41 using the exchange key 58 generated in that way and a seed key 59 obtained from the seed key 51 received in the first data processing unit 42 (audio-data decryption 60) to generate decrypted audio data 61. The seed key 59 may be generated from the seed key 37 sent from the source device 31.

In the embodiment of FIG. 2, two LSIs are used to allow the sink device 32 to process two signals individually so that the LSIs can send and receive signals independently. With this system configuration, only one of the two LSIs may authenticate the source device to generate the second authentication key 47 and the other LSI may decrypt the encrypted exchange key 56 sent from the first data processing unit 42 using the first authentication key 46 generated when the sink device 32 was turned on, to generate the exchange key 58, and thereafter, may decrypt the audio data. This eliminates the need for device authentication between the second LSI and the source device 31, as well as that between the first data processing unit and the source device 31, as in the related art, allowing quick output of content data. In particular, this embodiment exhibits high independence between the first data processing unit 42 and the second data processing unit 43, which is advantageous when encryption is absolutely necessary for transmission and reception of digital data.

Figure 3:
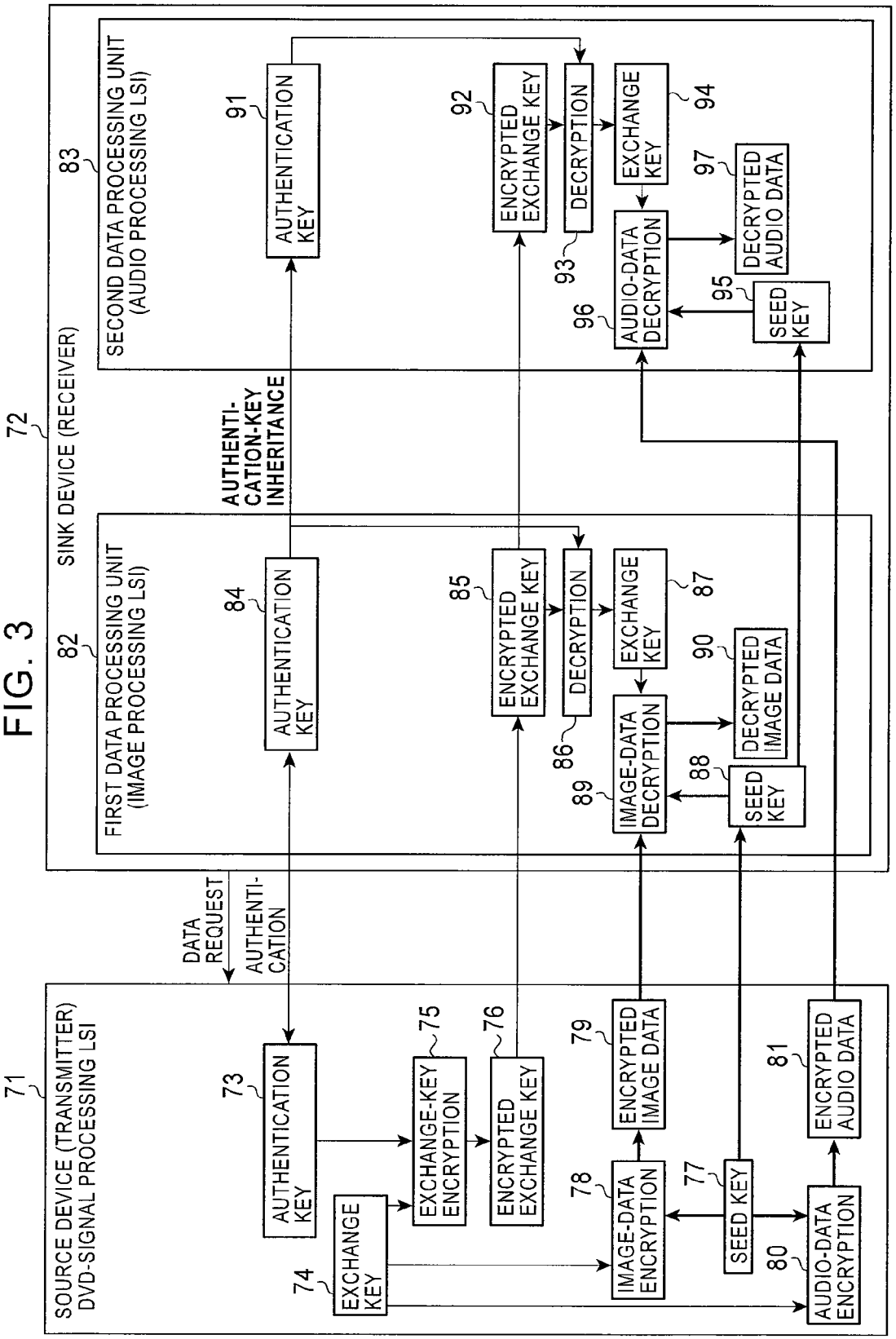
FIG. 3 is a diagram showing a system configuration and its operation according to yet another embodiment of the present invention.
Figure 4:
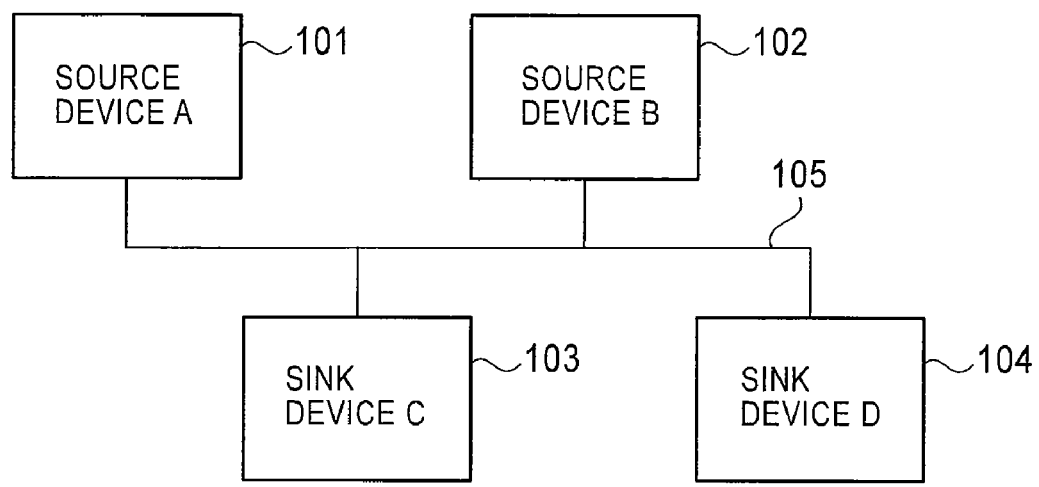
FIG. 4 is a diagram showing an example of the connection of conventional digital devices.
Figure 5:
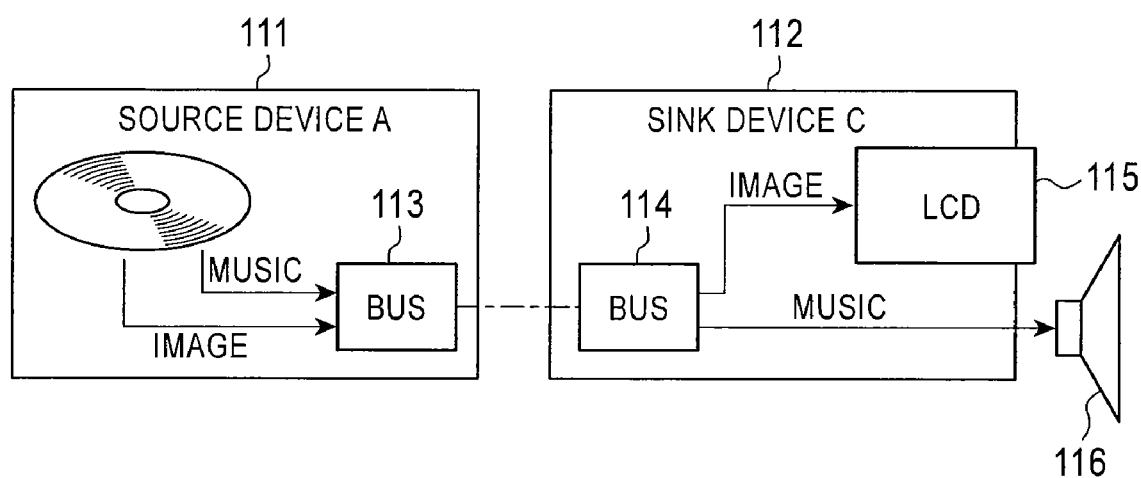
FIG. 5 is a diagram of the internal structure of conventional digital devices.
Figure 6:
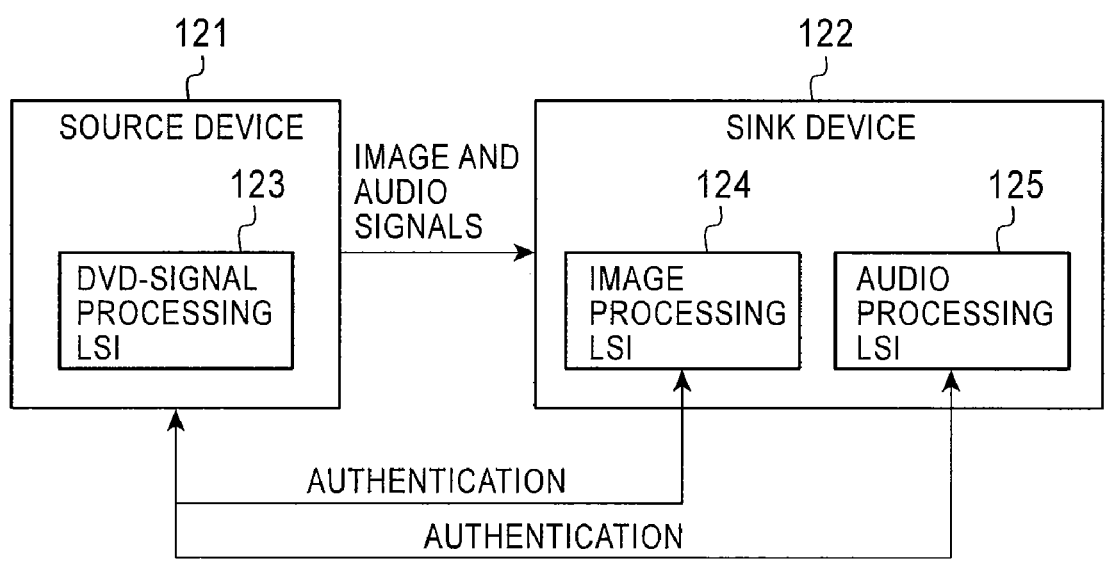
FIG. 6 is a diagram showing an example of authentication between devices.

The apparatus equipped with two LSIs in one device may be implemented by the technique shown in FIG. 3. In the embodiment of FIG. 3, a sink device 72 includes a first data processing unit 82 and a second data processing unit 83, as in FIG. 2, in which authentication keys can be exchanged. In this embodiment, after the sink device 72 issues a data request to a source device 71, authentication keys having the same data are generated, as in the foregoing embodiments. Specifically, an authentication key 73 is generated in the source device 71, and an authentication key 84 is generated in the first data processing unit 82 of the sink device 72. The first data processing unit 82 sends the authentication key 84 to the second data processing unit 83. The second data processing unit 83 stores the authentication key 84 as an authentication key 91. The authentication key 91 is erased at the same time the authentication key 84 of the first data processing unit 82 is erased when the connection with the source device 71 is cut off.

The subsequent process of the source device 71 is the same as described above. An exchange key 74 unique to the source device 71 is encrypted 75 using the generated authentication key 73 to create an encrypted exchange key 76. The source device 71 sends the encrypted exchange key 76 to the first data processing unit 82 which is an LSI that has executed authentication earlier in the sink device 72. The source device 71 encrypts image data and audio data using the exchange key 74 and a seed key 77 to send content data. Specifically, image data is subjected to image-data encryption 78 using the exchange key 74 and the seed key 77 into encrypted image data 79. Likewise, audio data is subjected to audio-data encryption 80 using the exchange key 74 and the seed key 77 into encrypted audio data 81. The encrypted image data 79 created in that way is sent to the first data processing unit 82 of the sink device 72. The seed key 77 is also sent to the first data processing unit 82.

The first data processing unit 82 of the sink device 72 receives the encrypted exchange key 76 sent in that way and holds it as an encrypted exchange key 85 of the first data processing unit 82. The exchange key is sent also to the second data processing unit 83. The second data processing unit 83 holds the exchange key as an encrypted exchange key 92. The first data processing unit 82 decrypts 86 the encrypted exchange key 85 using the authentication key 84 generated earlier to generate an exchange key 87. In image-data decryption 89, the first data processing unit 82 receives the encrypted image data 79 sent from the source device 71 and decrypts the encrypted image data 79 using the exchange key 87 generated in that way and a seed key 88 of the first data processing unit 82, which is generated from the seed key 77 of the source device 71 to obtain decrypted image data 90.

After receiving the encrypted exchange key 92 from the first data processing unit 82, the second data processing unit 83 decrypts 93 the encrypted exchange key 92 using the authentication key 91 inherited from the first data processing unit 82 to generate an exchange key 94. The second data processing unit 83 receives the encrypted audio data 81 sent from the source device 71, and decrypts 96 the encrypted audio data 81 using the exchange key 94 and a seed key 95 for the second data processing unit 83, which is obtained from the data of the seed key 88 received in the first data processing unit 82, to obtain decrypted audio data 97. The seed key 95 may also be generated directly from the seed key 77 sent from the source device 71, as in the above.

Thus, when two or more kinds of data are processed independently by two or more LSIs of one sink device, authentication keys generated for one of the LSIs and the source device can be used in the other LSIs. This eliminates the need for all the LSIs to perform authentication which takes much processing time, allowing the content data in the source device to be output quickly.

While the foregoing embodiments show examples in which the source device is a DVD-signal processing LSI and the sink device is an image and audio processing LSI such as a monitor, the present invention may be applied to an apparatus that sends and transmits a plurality of kinds of data.

The foregoing embodiments show examples of encrypted authentication between a first device and a second device which transmit or receive a plurality of kinds of data, in which a sink device that receives data executes the process of applying the result of encrypted authentication of one kind of data to the other kinds of data. This technique can also be applied to the source device. Specifically, when the source device includes an image LSI and an audio LSI and the sink device includes an LSI that processes images and voice, the source device may apply the result of encrypted authentication performed in image processing to audio processing or, conversely, may apply the result of encrypted authentication performed in audio processing to image processing, as in the examples of the sink device of the foregoing embodiments. Since the processing of this case is the same as that in the foregoing embodiments, its description will be omitted.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

The invention claimed is:

1. A method for encrypted authentication between a sending device and receiving device, the sending device transmitting at least a first type of data and a second type of data that is different from the first type of data, and the receiving device receiving at least the first type of data and the second type of data, wherein a result of encrypted authentication performed on the first type of data is applied to the second of data;

wherein the result of the encrypted authentication is a result of receiving an encrypted exchange key generated by the sending device and decrypting the encrypted exchange key using an authentication key between the sending and receiving devices to obtain an exchange key; and wherein the method comprises:
receiving the first type of data that is encrypted using an exchange key generated by the sending device and decrypting the first type of data using the decrypted exchange key; and
receiving the second type of data and decrypting the second type of data using the decrypted exchange key.

2. A method for encrypted authentication between a sending device and receiving device, the sending device transmitting at least a first type of data and a second type of data that is different from the first type of data, and the receiving device receiving at least the first type of data and the second type of data, wherein a result of encrypted authentication performed on the first type of data is applied to the second type of data;

wherein the result of the encrypted authentication is the result of receiving an encrypted exchange key generated by the receiving device and decrypting the encrypted exchange key using an authentication key between the sending and receiving devices to obtain an exchange key; and wherein the method comprises:
receiving the first type of data encrypted using an exchange key generated by the receiving device and decrypting the first type of data using the decrypted exchange key; and
receiving the second type of data and decrypting the second type of data using the decrypted exchange key.

3. A method for encrypted authentication between a first device and a second device, the first device configured to transmit or receive at least a first type of data and a second type of data that is different from the first type of data, and the second device configured to transmit or receive at least the first type of data and the second type of data, wherein a result of encrypted authentication performed on the first type of data is applied to the second type of data, the method comprising:

generating first authentication keys for device authentication with a first data processing unit and a second data processing unit of the first device; and generating second authentication keys for device authentication with the first data processing unit of the first device and the second device;

wherein the first data processing unit:
decrypts data sent from the second device using the second authentication key, the data being encrypted using the second authentication key,
encrypts the decrypted data using the first authentication key, and
sends the encrypted data to the second data processing unit; and wherein the second data processing unit decrypts the encrypted data received from the first data processing unit using the first authentication key.

4. The method for encrypted authentication of claim 3, wherein the data encrypted by the second device using the second authentication key is an exchange key;

the first data processing unit decrypts data of the first type of data using the exchange key, the data of the first type of data being encrypted by the second device using the exchange key; and the second data processing unit decrypts data of the second type of data using the exchange key encrypted by the first data processing unit and decrypted by the second data processing unit, the data of the second type of data being encrypted by the second device using the exchange key.

5. A method for encrypted authentication between a first device and a second device, the first device configured to transmit or receive at least a first type of data and a second type of data that is different from the first type of data, and the second device configured to transmit or receive at least the first type of data and the second type of data, wherein a result of encrypted authentication performed on the first type of data is applied to the second type of data, the method comprising:

generating authentication keys for device authentication between the first data processing unit of the first device and the second device;

wherein the first data processing unit:
  decrypts data sent from the second device using the authentication key, the data being encrypted by the authentication key, and
  sends the authentication key to a second data processing unit of the first device; and wherein the second data processing unit decrypts data sent from the second device using the authentication key received from the first data processing unit, the data being encrypted by the authentication key.

6. The method for encrypted authentication of claim 5, wherein the data encrypted by the second device using the authentication key is an exchange key;

the first data processing unit decrypts data of the first type of data using the exchange key, the data of the first type of data being encrypted by the second device using the exchange key; and the second data processing unit decrypts data of the second type of data using the exchange key decrypted by the second data processing unit, the data of the second type of data being encrypted by the second device using the exchange key.

7. An apparatus for encrypted authentication between a first device and a second device, the first device configured to transmit or receive at least a first type of data and a second type of data that is different from the first type of data and the second device configured to transmit or receive at least the first type of data and the second type of data, the apparatus comprising:

an authentication-key generating section configured to authenticate the second device that transmits at least the first type of data and the second type of data and the first device to generate authentication keys; and a processing section configured to apply a result of encrypted authentication in the processing of the first type of data using the authentication keys to the processing of the second type of data.

8. The apparatus for encrypted authentication of claim 7, wherein the first type of data comprises image data and the second type of data comprises audio data related to the image data.

9. The apparatus for encrypted authentication of claim 7, wherein the first device includes a first data processing unit and a second data processing unit; and wherein the apparatus comprises:
  a first-authentication-key generating section configured to generate first authentication keys for device authentication between the first data processing unit and the second data processing unit of the first device;
  a second-authentication-key generating section configured to generate second authentication keys for device authentication between the first data processing unit of the first device and the second device;
  a decrypting section of the first data processing unit configured to decrypt data sent from the second device, the data being encrypted using the second authentication key;
  a transmitting section of the first data processing unit configured to encrypt the data decrypted by the decrypting section of the first data processing unit using the first authentication key, and to send the encrypted data to the second data processing unit; and
  a decrypting section of the second data processing unit configured to receive the encrypted data sent from the transmitting section of the first data processing unit and decrypt the encrypted data using the first authentication key.

10. The apparatus for encrypted authentication of claim 9, wherein the data encrypted by the second device using the second authentication key is an exchange key;

the decrypting section of the first data processing unit decrypts data of the first type of data using the exchange key, the data of the first type of data being encrypted by the second device using the exchange key; and the decrypting section of the second data processing unit decrypts data of the second type of data using the exchange key encrypted by the first data processing unit and decrypted by the second data processing unit, the data of the second type of data being encrypted by the second device using the exchange key.

11. The apparatus for encrypted authentication of claim 7, wherein the first device includes a first data processing unit and a second data processing unit; and wherein the apparatus comprises:
  an authentication-key generating section configured to generate authentication keys for device authentication between the first data processing unit of the first device and the second device;
  an authentication-key transmitting section configured to send the authentication key generated by the first data processing unit to the second data processing unit;
  a decrypting section of the first data processing section configured to decrypt data sent from the second device using the authentication key, the data being encrypted by the authentication key; and
  a decrypting section of the second data processing section configured to decrypt data sent from the second device using the authentication key received from the first data processing unit, the data being encrypted by the authentication key.

12. The apparatus for encrypted authentication according to claim 11, wherein the data encrypted by the second device using the authentication key is an exchange key;

the decrypting section of the first data processing unit decrypts data of the first type of data using the exchange key, the data of the first type of data being encrypted by the second device using the exchange key; and the decrypting section of the second data processing unit decrypts data of the second type of data using the exchange key decrypted by the second data processing unit, the data of the second type of data being encrypted by the second device using the exchange key.

* * * * *

UNITED STATES PATENT AND TRADEMARK OFFICE
CERTIFICATE OF CORRECTION

| | | |
|---|---|---|
| PATENT NO. | : 8,200,973 B2 | Page 1 of 1 |
| APPLICATION NO. | : 12/270478 | |
| DATED | : June 12, 2012 | |
| INVENTOR(S) | : Akihiro Kubota et al. | |

It is certified that error appears in the above-identified patent and that said Letters Patent is hereby corrected as shown below:

In column 10, claim 1, line 11, after "to the second" insert --type--.

Signed and Sealed this
Twenty-ninth Day of January, 2013

David J. Kappos
*Director of the United States Patent and Trademark Office*